United States Patent [19]

Shouji et al.

[11] Patent Number: 5,722,157
[45] Date of Patent: Mar. 3, 1998

[54] METHOD OF MAKING AN INDUCTION AND MAGNETORESISTANCE TYPE COMPOSITE MAGNETIC HEAD

[75] Inventors: Shigeru Shouji; Atsushi Toyoda, both of Hamamatsu, Japan

[73] Assignee: Yamaha Corporation, Japan

[21] Appl. No.: 673,667

[22] Filed: Jun. 25, 1996

[30] Foreign Application Priority Data

Jun. 28, 1995 [JP] Japan .................................. 7-186320

[51] Int. Cl.$^6$ .................................................. G11B 5/127
[52] U.S. Cl. ............................ 29/603.14; 29/603.15; 29/603.16; 360/113; 360/122; 427/131
[58] Field of Search .......................... 29/603.12, 603.15, 360/113, 119, 122, 125; 427/130, 131

[56] References Cited

U.S. PATENT DOCUMENTS

| | | | |
|---|---|---|---|
| 3,908,194 | 9/1975 | Romankiw | 360/122 X |
| 4,639,289 | 1/1987 | Lazzari | 29/603.15 X |
| 4,663,685 | 5/1987 | Tsang | 360/113 |
| 4,670,972 | 6/1987 | Sakakima | 29/603.13 |
| 4,939,837 | 7/1990 | Krounbi | 427/130 X |
| 5,045,961 | 9/1991 | Kobayashi et al. | 29/603.15 X |
| 5,075,956 | 12/1991 | Das | 29/603.14 |
| 5,142,768 | 9/1992 | Aboaf et al. | 427/131 X |
| 5,167,062 | 12/1992 | Castera et al. | 29/603.14 |

*Primary Examiner*—Peter Vo
*Attorney, Agent, or Firm*—Ostrolenk, Faber, Gerb & Soffen, LLP

[57] ABSTRACT

In an induction- and MR-type composite magnetic head of the type that one of two shield films of an MR-type magnetic head serves as one of two cores of an induction-type magnetic head, conductive leads are thicker than an MR element so that steps are formed at the boundaries between an MR element sensitive region and the conductive leads. An upper gap layer has a constant thickness and has a recess 56 on its upper surface because of topographical transfer of the underlying steps. An upper shield—lower core layer has a downward convex at its lower surface, because of topographical transfer of the recess on the upper surface of the upper gap layer. However, the upper surface of the upper shield—lower core layer is flat and parallel to the MR element. Therefore, a write gap layer formed thereon is made flat and parallel to the MR element. Steps of the write gap can be removed and a record density can be increased.

6 Claims, 9 Drawing Sheets

ANALYSIS OF PRIOR ART

ANALYSIS OF PRIOR ART

ANALYSIS OF PRIOR ART

METHOD OF MAKING AN INDUCTION AND MAGNETORESISTANCE TYPE COMPOSITE MAGNETIC HEAD

BACKGROUND OF THE INVENTION a) Field of the Invention

The present invention relates to induction- and magnetoresistance(MR)-type composite magnetic heads for hard disks or the like.

b) Description of the Related Art

An MR-type magnetic head is a reproduction-only magnetic head which detects a magnetic field established between magnetic poles of a magnetic recording medium with an MR element and reproduces recorded information. Its advantage over an induction-type magnetic head is that the number of tracks per inch and the number of bits per inch can be increased. An MR-type magnetic head for reading information combined with an induction-type magnetic head for recording information constitutes an induction- and MR-type composite magnetic head.

A conventional induction- and MR-type composite magnetic head for hard disk is shown in FIGS. 2A and 2B. FIG. 2A is a cross sectional side view, and FIG. 2B is a perspective view as seen from the recording medium facing side. In FIG. 2A, the bottom surface of the composite magnetic head is continuous with the slider surface of a substrate 16 and forms a magnetic read/write surface. On an MR-type magnetic head 12, an induction-type magnetic head 14 is stacked to constitute an induction- and MR-type composite magnetic head 10. Both the heads 12 and 14 are formed on the back end surface of the slider substrate by thin film forming technology.

On the slider substrate 16, a lower shield layer 18 of high magnetic permeability of the MR-type magnetic head 12 is formed. On the lower shield layer 18, a lower gap layer (reproduction gap layer) 20 made of an insulating layer is laminated. On the lower gap layer 20, an MR element 28 is formed whose end surface, together with the substrate surface, constitutes a recording medium facing surface (i.e. ABS surface : Air Bearing Surface) 24 (FIG. 2B). The MR element 28 is a laminate of an MR film 46, a spacer 48, and an SAL bias film 50 (Soft Adjacent Layer : adjacent soft magnetic layer) stacked on the lower gap layer 20 in this order. Lead conductors 30 and 31 are connected to right and left sides of the MR element 28. A portion of the MR element 28 which the leads 30 and 31 do not cover forms a sensitive region and a portion which the leads 30 and 31 cover forms an insensitive region. On the MR element 28 and leads 30 and 31, an upper gap layer (reproduction gap layer) 32 made of an insulating film is formed, and on the upper gap layer 32 an upper shield layer 34 is formed which is made of soft magnetic material of high magnetic permeability such as Sendust and permalloy.

The upper shield layer 34 also serves as the lower core layer of the induction-type magnetic head 14. On the upper shield layer 34, a write gap layer 36, a coil and insulating layer 38, an upper core layer 40, and a protective layer 42 are sequentially laminated.

In recording by the use of the induction- and MR-type composite magnetic head 10 shown in FIGS. 2A and 2B, a record signal flows through the coil of the induction-type magnetic head 14 to generate a recording magnetic field in the write gap layer 36 between the upper and lower core layers 40 and 34 and record information with this magnetic field. In reproducing, a sense current is flowed through the MR element 28 via the leads 30 and 31 of the MR-type magnetic head 12. As the head traces a track of a recording medium, a voltage across the MR element 28 is modulated with information recorded on the track. The modulated voltage is detected to reproduce the information.

SUMMARY OF THE INVENTION

It is an object of the present invention to provide an induction- and MR-type composite magnetic head and its manufacture, the head being of the type that one of the shield films of the MR-type magnetic head serves as one of the cores of the induction-type magnetic head, and capable of forming sharp reproduced waveforms and providing high record density.

It is another object of the present invention to provide an induction- and MR-type composite magnetic head and its manufacture, capable of recording linear inverted magnetization patterns.

According to one aspect of the present invention, there is provided a method of manufacturing an induction- and MR-type composite magnetic head comprising the steps of: forming a magnetoresistive sensor film on a flat surface of a substrate having a slider surface generally perpendicular to the flat surface; forming a pair of conductive lead films on the magnetoresistive sensor film and the substrate to define a sensitive region of the magnetoresistive sensor film therebetween; forming a nonmagnetic insulating film and a first soft magnetic layer over the substrate, the nonmagnetic insulating film covering the lead films and the magnetoresistive sensor film, and the nonmagnetic insulating film and the first soft magnetic layer having upper surfaces topographically reflecting the lead films; lapping the surface of the first soft magnetic layer to form a flat surface; and forming a second soft magnetic layer on the flat surface of the first soft magnetic layer, with a write gap being interposed between the first and second soft magnetic layers.

The upper surface of the first soft magnetic layer is lapped to remove the recess of the upper surface and make the first soft magnetic layer have a flat surface parallel to the sensitive region of the MR sensor film. It is therefore possible to manufacture an induction- and MR-type composite magnetic head having a write gap parallel to the sensitive region of the MR sensor film.

After the first soft magnetic layer is laminated, a sacrificial film of inorganic material may be formed on the upper surface of the first soft magnetic layer. In this case, the substrate is lapped from the inorganic insulating film toward the first soft magnetic layer.

If the sacrificial film is formed on the upper surface of the first soft magnetic layer to bury the recess on the upper surface of the first soft magnetic layer and a lapping process is performed in this state, then cracks can be prevented from being formed in the first soft magnetic layer during the lapping and manufacture yield can be improved.

Since the upper surface of the first soft magnetic layer has a flat surface parallel to the sensitive region, the write gap formed thereon becomes also parallel to the sensitive region. Therefore, with this write gap, inverted magnetization patterns of a signal formed on a recording medium become linear. The waveform of a recorded signal read with the linear MR sensor film becomes sharp, and a change in signals recorded in a narrow area becomes clear. Accordingly, a peak of a read waveform of a single bit can be detected finely with respect to the time axis. Since a number of inverted magnetization patterns can be recorded in a narrow area of a recording medium, a record density can be increased. Furthermore, the nonmagnetic insulating layer can be made thin and a predetermined narrow reproduction gap can be formed, because the nonmagnetic insulating layer has the recess at its upper surface at the position of the sensitive region of the MR sensor film, the recess being formed by topographic transfer of the steps formed at the boundaries between the sensitive region of the MR sensor and the leads. If the upper surface of the nonmagnetic insulating layer is made flat, the nonmagnetic insulating layer becomes thick at the position of the sensitive region of the MR sensor film and the record density is lowered.

As above, the write gap can be formed in parallel to the sensitive region of the MR sensor film. With this write gap, inverted magnetization patterns of a signal recorded on a recording medium become linear. The waveform of a recorded signal reproduced with the MR sensor film becomes sharp so that inverted magnetization patterns can be detected reliably with respect to the time axis. Furthermore, a predetermined narrow reproduction gap can be formed and the record density can be made high, because the nonmagnetic insulating layer has the recess at its upper surface at the position of the sensitive region of the MR sensor film, the recess being formed by topographic transfer of the steps formed at the boundaries between the sensitive region of the MR sensor and the leads.

Still further, it is possible to manufacture an induction- and MR-type composite magnetic head having a write gap parallel to the sensitive region of the MR sensor film.

Moreover, cracks can be prevented from being formed in the first soft magnetic layer during the lapping and manufacture yield can be improved.

DETAILED DESCRIPTION OF THE PREFERRED EMBODIMENTS

Prior to the description of embodiments, analyses of conventional techniques made by the present inventors will be described.

Figure 2A:
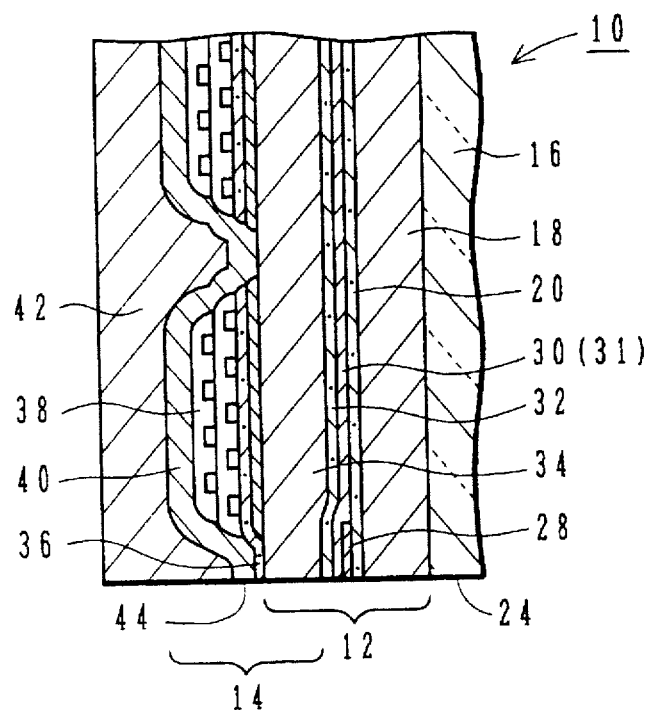
FIGS. 2A is a cross sectional side view of a conventional induction- and MR-type composite magnetic head.
Figure 2B:
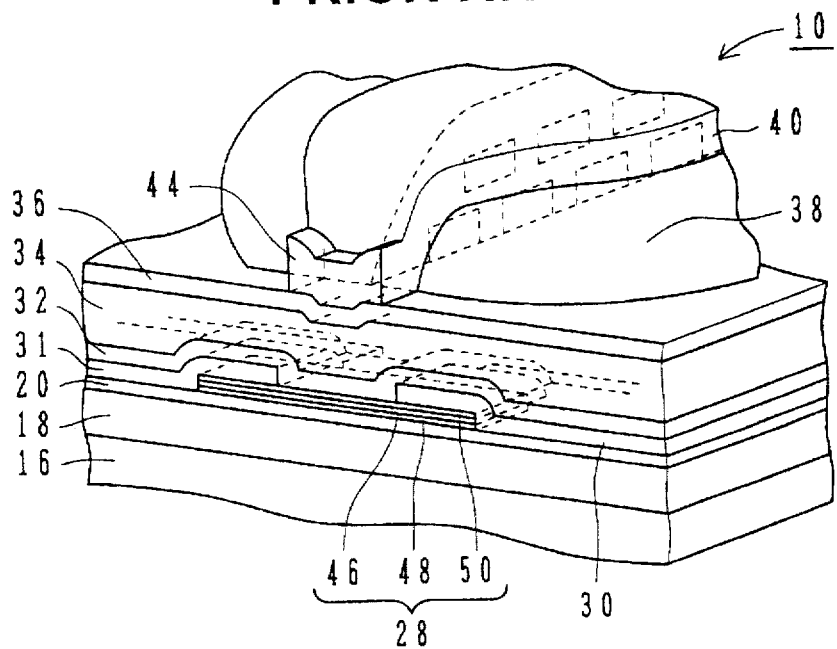
FIG. 2B is a perspective view thereof as seen from the air bearing surface side.
Figure 3:
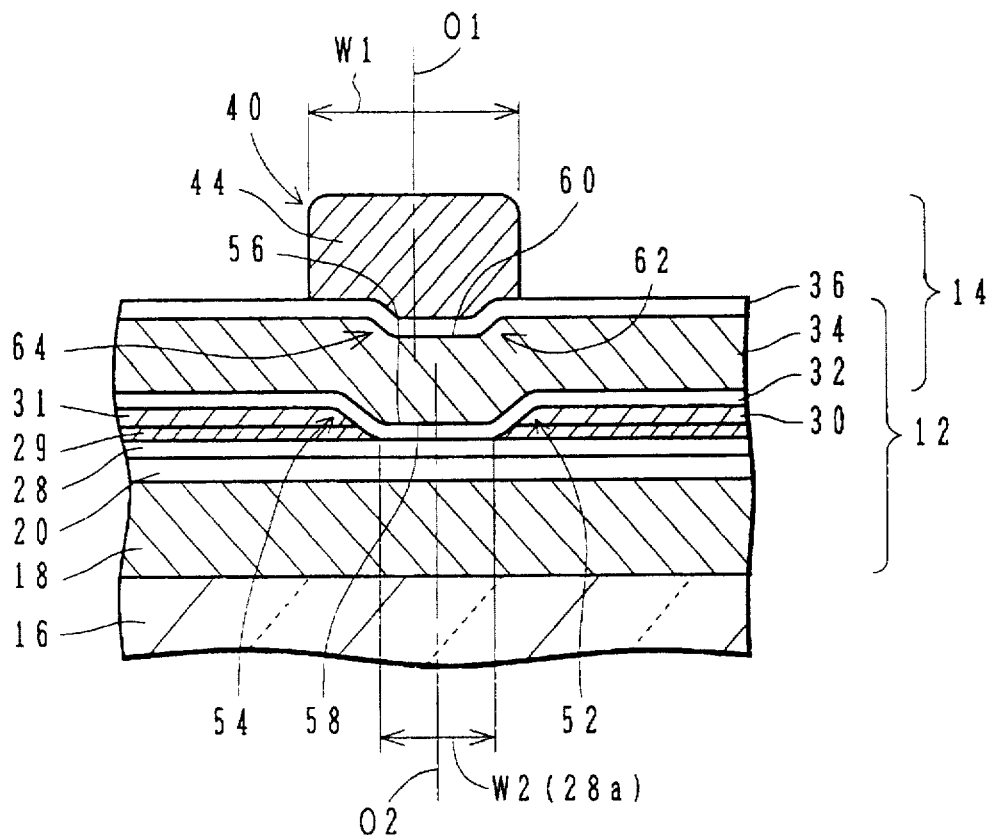
FIG. 3 is a front view of an induction- and MR-type composite magnetic head seen from the air bearing surface side, explaining analyses made by the present inventors.

FIG. 3 is a front view of the induction- and MR-type composite magnetic head 10 shown in FIGS. 2A and 2B as seen from the air bearing surface 24 side. Lead films 30 and 31 thicker than the MR element 28 and having a low resistance are formed on the left and right side areas of the MR element 28, through a pair of longitudinal magnetic bias films 29. A portion of the MR element 28 between the leads 30 and 31 forms a sensitive region 28a. Generally, a write width (generally the width of an upper pole 44) W1 is set wider than the width W2 of the sensitive region 28a. The center 01 of the upper pole width is offset from the center 02 of the width of the MR element sensitive region.

In the manufacture processes for the induction- and MR-type composite magnetic head 10 shown in FIG. 3, after the leads 30 and 31 are formed on the MR element 28, steps 52 and 54 are formed at the boundaries between the MR element sensitive region 28a and the leads 30 and 31. When an upper gap layer 32 is formed over the substrate thereafter, a recess 56 is formed on the upper surface of the upper gap layer 32, because of topographical transfer of the underlying steps 52 and 54. When an upper shield—lower core layer 34 is formed thereon, a downward convex 58 is formed at the lower surface of the layer 34, and a recess 60 is formed at the upper surface, because of topographical transfer of the underlying recess 56 of the upper gap layer 32. Therefore, when a write gap layer 36 is formed on the upper shield—lower core layer 34, the write gap layer 36 is formed with stepped portions 62 and 64 are formed, because of topographical transfer of the recess 60 on the upper surface of the upper shield—lower core layer 34. These stepped portions 62 and 64 are formed, as viewed from the pole front surface, inside the width of the MR element sensitive region 28a because the leads 30 and 31 are thick.

Figure 4:
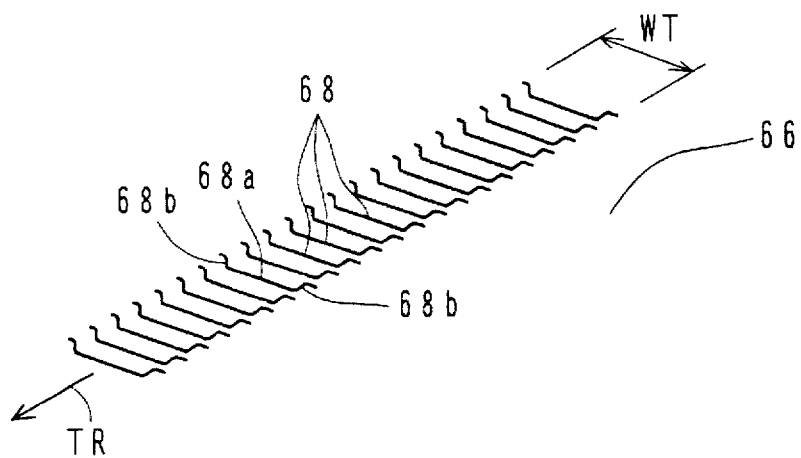
FIG. 4 is a perspective view showing inverted magnetization patterns of a signal recorded with a conventional induction-type magnetic head.

FIG. 4 shows signal patterns recorded on a recording medium (hard disk) 66 with the composite magnetic head 10 having the write gap 36 formed with the stepped portions 62 and 64. The signal is recorded on the recording medium 66 while forming a magnetized area (inverted magnetization area) 68 with bent portions. Namely, the inverted magnetization area 68 includes central linear and parallel magnetization patterns 68a and sideways bent magnetization patterns 68b, these patterns being distributed along a track direction TR at the write track width WT. These signal patterns with the bent magnetization patterns 68b are read with the MR-type magnetic head 12. Since the MR element sensitive region 28a itself is linear and has no bent portions, the reproduced signal has signal components shifted in the time axis by the bent magnetization patterns 68b.

Figure 5:
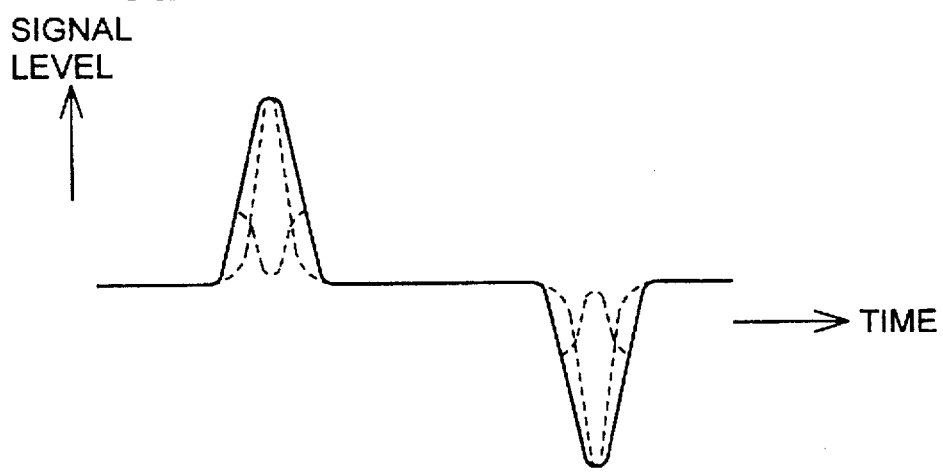
FIG. 5 shows a signal waveform of record patterns reproduced with a conventional MR-type magnetic head.

A partial waveform of the reproduced signal is shown in FIG. 5. The waveform of the reproduced signal is a composite of: a sharp waveform of a signal read from the parallel magnetization patterns 68a at the central area of the track width WT; and a waveform of a signal read from the bent magnetization patterns 68b before and after the sharp waveform, and has a low peak and a gently lowering skirt portion. Such a reproduced signal results in unstable pickup of the peak position and hinders a higher record density.

Figure 1A:
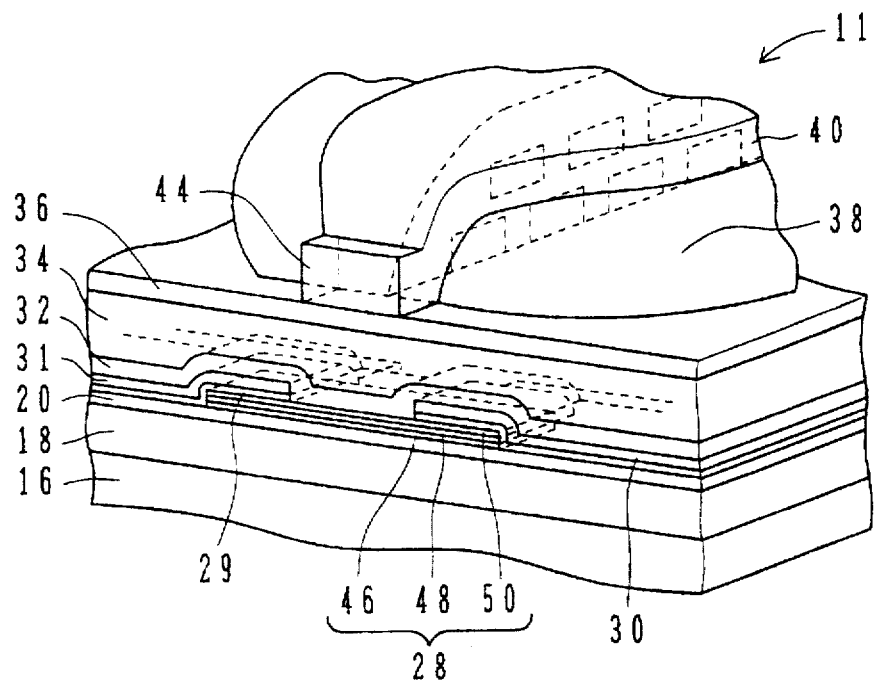
FIG. 1A is a perspective view of an induction- and MR-type composite magnetic head as seen from the air bearing surface side according to an embodiment of the invention.
Figure 1B:
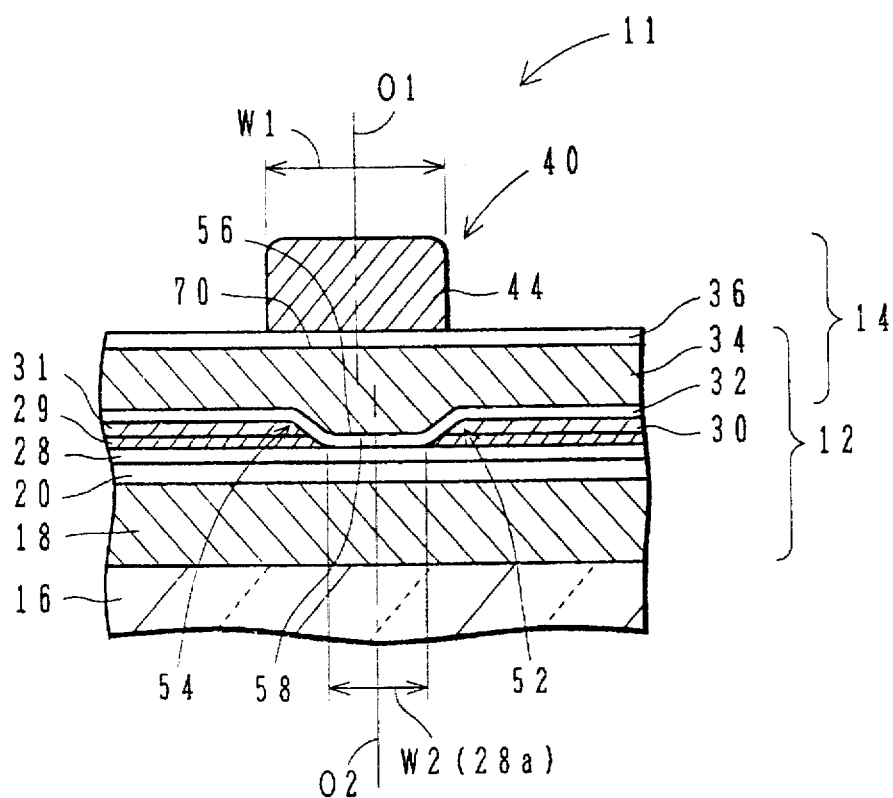
FIG. 1B is a front view of the composite magnetic head (bottom view of a rear portion of a slider head).

An induction- and MR-type composite magnetic head according to an embodiment of this invention is shown in FIGS. 1A and 1B. The composite magnetic head is formed on the back end surface of a slider substrate which has a slider surface on its lower surface. Although the slider surface may be slightly irregular or have small curvature, the slider surface is disposed generally perpendicular to the back end surface. Like elements to those of the conventional composite magnetic head 10 shown in FIGS. 2A, 2B and 3 are represented by using identical reference numerals, and the description given for the conventional composite magnetic head 10 is to be referred to when necessary. FIG. 1A is a perspective view of the composite magnetic head as viewed from the recording medium facing side, and FIG. 1B is a front view thereof.

An induction-type magnetic head 14 is stacked upon an MR-type magnetic head 12 to constitute an induction- and MR-type composite magnetic head 11. Both the heads 12 and 14 are formed by thin film forming technology.

In the MR-type magnetic head 12, a lower shield layer 18 of high magnetic permeability material is formed on the upper surface (in the figures) of a slider substrate 16 having a slider surface on its bottom surface. The upper flat surface of the substrate 16 is a back end surface of the slider. On the lower shield layer 18 a lower gap layer 20 made of a nonmagnetic insulating layer is laminated. On the lower gap layer 20 an MR element 28 is formed whose end surface constituting the recording medium facing surface or air bearing surface 24. The MR element 28 is a laminate of an MR film 46, a spacer 48, and an SAL (soft adjacent layer) bias film 50 stacked on the lower gap layer 20 in this order. Leads 30 and 31 are connected to right and left sides of the MR element 28 through a pair of longitudinal magnetic bias films 29. A portion of the MR element 28 which the leads 30 and 31 do not cover forms a sensitive region and a portion which the leads 30 and 31 cover forms an insensitive region. On the MR element 28 and leads 30 and 31, an upper gap layer 32 made of a nonmagnetic insulating film is formed, and on the upper gap layer 32 an upper shield layer 34 also serving as a lower core layer of the induction-type magnetic head 14 is formed which is made of high magnetic permeability material.

The leads 30 and 31 are thicker than the MR element 28 so that steps 52 and 54 are formed at the boundaries between the MR element sensitive region 28a and the leads 30 and 31. The upper gap layer 32 is formed to a predetermined thickness and has a recess 56 on its upper surface, because of topographical transfer of the underlying steps 52 and 54. The upper shield—lower core layer 34 has a downward convex 58 at its lower surface, because of topographical transfer of the recess 56 on the upper surface of the upper gap layer 32. However, the upper surface 70 of the upper shield—lower core layer 34 is flat and parallel to the MR element 28. Therefore, a write gap layer 36 formed thereon is made flat and parallel to the MR element 28.

On the upper shield—lower core layer 34, the write gap layer 36, a coil and insulating layer 38, an upper core layer 40, and a protective layer 42 are sequentially laminated. A write width (generally the width of an upper pole 44) W1 is set wider than the width W2 of the sensitive region 28a. The center 01 of the upper pole width is offset from the center 02 of the MR element sensitive region width.

In recording by the use of the induction- and MR-type composite magnetic head 11 shown in FIGS. 1A and 1B, a record signal flows through the coil of the induction-type magnetic head 14 to generate a record magnetic field in the write gap layer 36 between the upper and lower core layers 40 and 34 and record information with this magnetic field. In reproducing, a sense current is flowed through the MR element 28 via the leads 30 and 31 of the MR-type magnetic head 12. As the head traces a track of a recording medium, a voltage across the MR element 28 is modulated with information recorded on the track. The modulated voltage is detected to reproduce the information. A magnetic field detected for the reproduction is a magnetic field formed in a space between the lower shield layer 18 and the upper shield—lower core layer 34.

Figure 6:
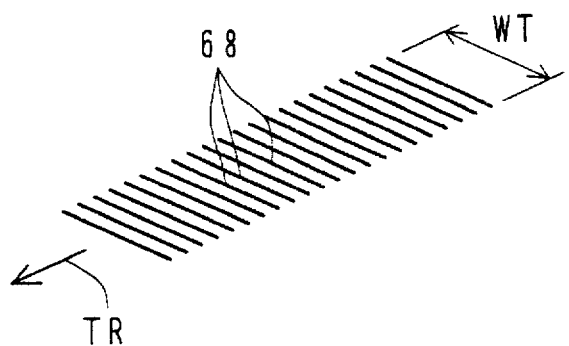
FIG. 6 is a perspective view showing inverted magnetization patterns of a signal recorded with an embodiment induction-type magnetic head shown in FIGS. 1A and 1B.

FIG. 6 shows inverted magnetization patterns of a signal recorded on a recording medium (hard disk) with the induction-type head 14 shown in FIGS. 1A and 1B. Since the write gap 36 is formed linearly flat, an inverted magnetization area 68 has linear, parallel patterns having a track width WT and perpendicular to the track direction TR.

Figure 7:
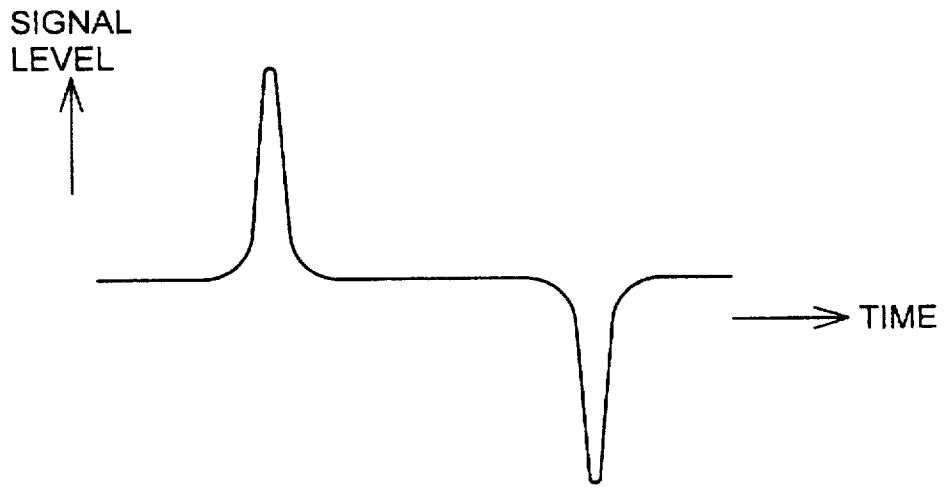
FIG. 7 shows a signal waveform of record patterns reproduced with an embodiment MR-type magnetic head shown in FIGS. 1A and 1B.

FIG. 7 shows a signal waveform of the inverted magnetization patterns shown in FIG. 6 reproduced with the MR-type magnetic head 12 shown in FIGS. 1A and 1B. The MR element sensitive region 28a traces the inverted magnetization area 68 having linear and parallel patterns. Therefore, the MR element sensitive region 28a and the inverted magnetization area 68 are coincident with each other at a narrow width in the time axis, and the waveform of the reproduced signal is sharp and has a high peak. Such a reproduced signal has a distinct peak position and a large output and is resistant to noises, and so it is very effective for achieving a high record density.

In the above embodiment, the MR element 28 used is a laminate of the MR film 46, spacer 48, and SAL bias film 50. The invention is not limited only to such an MR element, but other MR elements of various structures may be also be used. For general knowledge about MR elements, reference is made to U.S. patent application Ser. No. 08/579,928 filed on Dec. 28, 1995, and U.S. patent application Ser. No. 08/580,296 filed on Dec. 28, 1995 by the same inventors as the present application, which are herein incorporated by reference.

Next, a method of manufacturing the induction- and MR-type composite magnetic head 11 shown in FIGS. 1A and 1B according to an embodiment of the invention will be described with reference to FIGS. 8A to 8K.

Figure 8A:
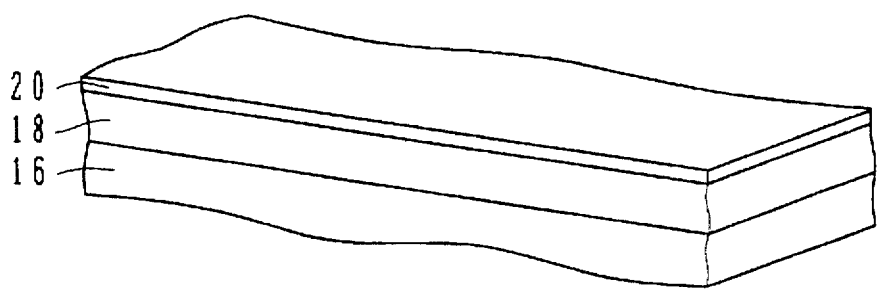
FIGS. 8A to 8K are perspective views illustrating the processes of manufacturing the induction- and MR-type composite magnetic head shown in FIG. 1 according to an embodiment of the invention.

(1) As shown in FIG. 8A, on a substrate 16 made of ceramic material or the like such as $Al_2O_3$—TiC and having a protective film such as alumina ($Al_2O_3$), a lower shield layer 18 is formed. The lower shield layer 18 may be formed by depositing on the substrate a soft magnetic film of, for example, permalloy (NiFe), Sendust, or the like, through sputtering, evaporation, or plating. On the lower shield layer 18, a lower gap layer 20 made of nonmagnetic insulating material such as alumina is deposited.

Figure 8B:
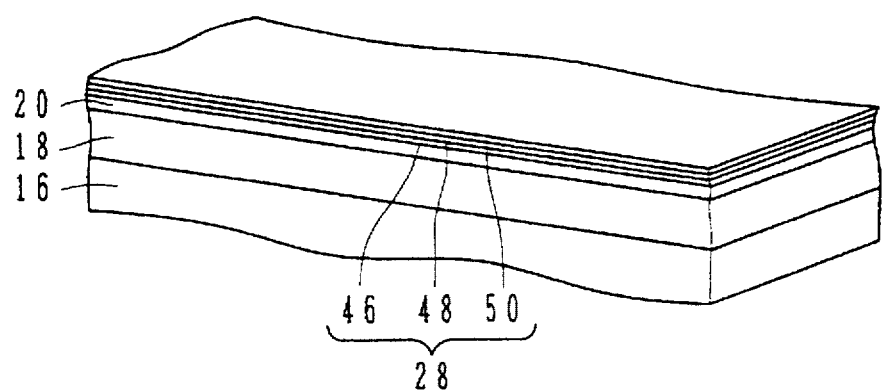

(2) As shown in FIG. 8B, on the lower gap layer 20, an MR element 28 is formed by laminating an MR film 46 (NiFe or the like), a spacer 48 (Ti or the like), and an SAL bias film 50 (such as CoZrM (M is Nb, Mo, or the like) or the like).

Figure 8C:
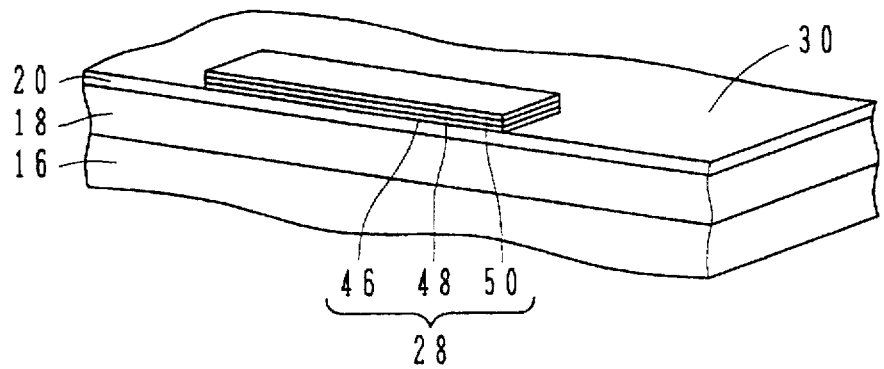

(3) As shown in FIG. 8C, the MR element 28 is patterned rectangularly. The MR film 46 is formed with an easy axis of magnetization in its longitudinal direction (in the direction parallel to the surface of a recording medium and perpendicular to the track direction).

Figure 8D:
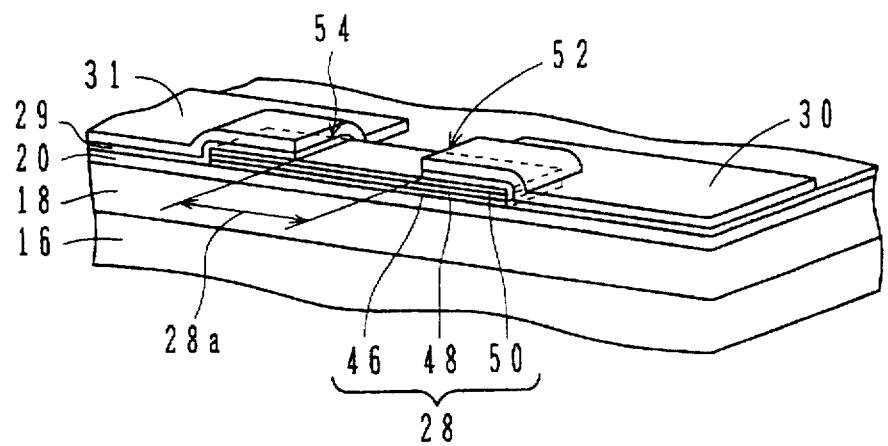

(4) As shown in FIG. 8D, a highly conductive film (W, Ta, or the like) is deposited and patterned to a predetermined shape to form electrode leads 30 and 31 on opposite sides of the MR element 28. In this case, steps 52 and 54 are formed at the boundaries between the MR element sensitive region 28a and the leads 30 and 31.

Figure 8E:
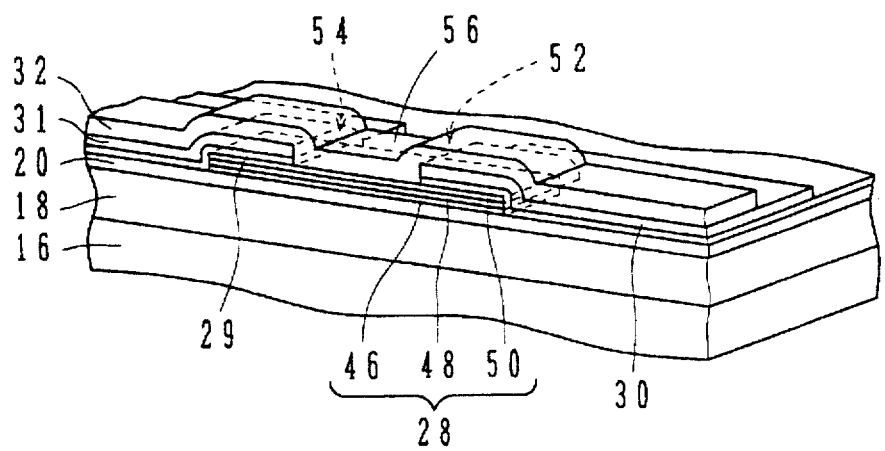

(5) As shown in FIG. 8E, an upper gap layer 32 (such as alumina) is deposited over the MR element 28 and leads 30 and 31. In this case, the upper gap layer 32 is formed with a recess 56 at its upper surface, because of topographical transfer of the underlying steps 52 and 54.

Figure 8F:
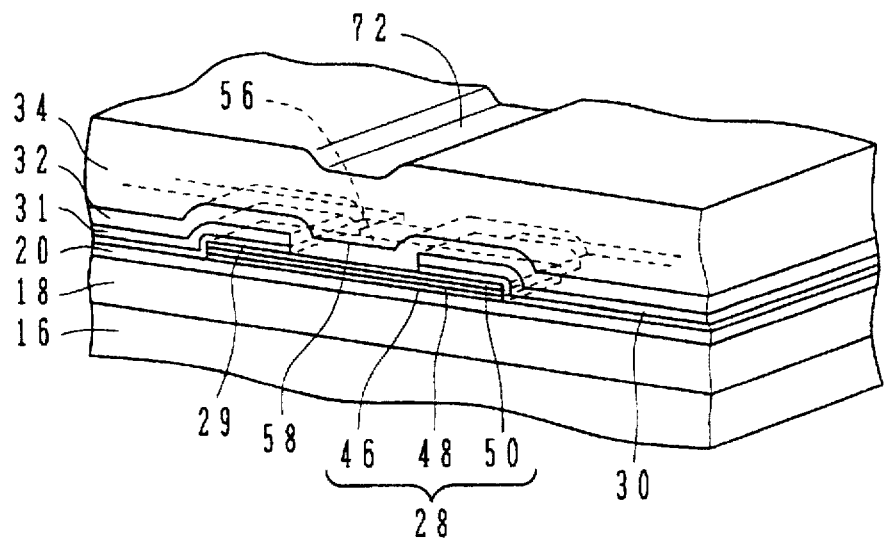

(6) As shown in FIG. 8F, an upper shield—lower core layer 34 is deposited on the upper gap layer 32, by using soft magnetic material such as permalloy and Sendust. The upper shield—lower core layer 34 is formed with a downward convex 58 at its lower surface and a recess 72 at its upper surface, because of topographical transfer of the recess 56 on the upper surface of the upper gap layer 32. The upper shield—lower core layer 34 is deposited sufficiently thick so that when it is lapped to a predetermined thickness at a later process (8), the recess 72 is removed.

Figure 8G:
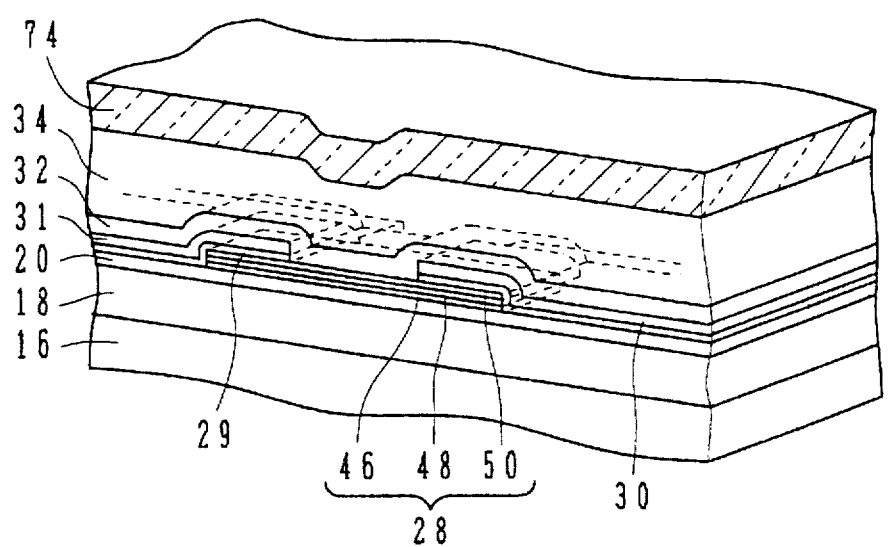

(7) As shown in FIG. 8G, on the upper shield—lower core layer 34, an inorganic insulating film 74 made of alumina or the like is deposited through sputtering or the like. Preferably, the insulating film 74 made of ceramic material is used because ceramic material is chemically stable and does not affect magnetic material. This film 74 is a sacrificial film for polishing, and may be any film if it provides a predetermined function during lapping.

Figure 8H:
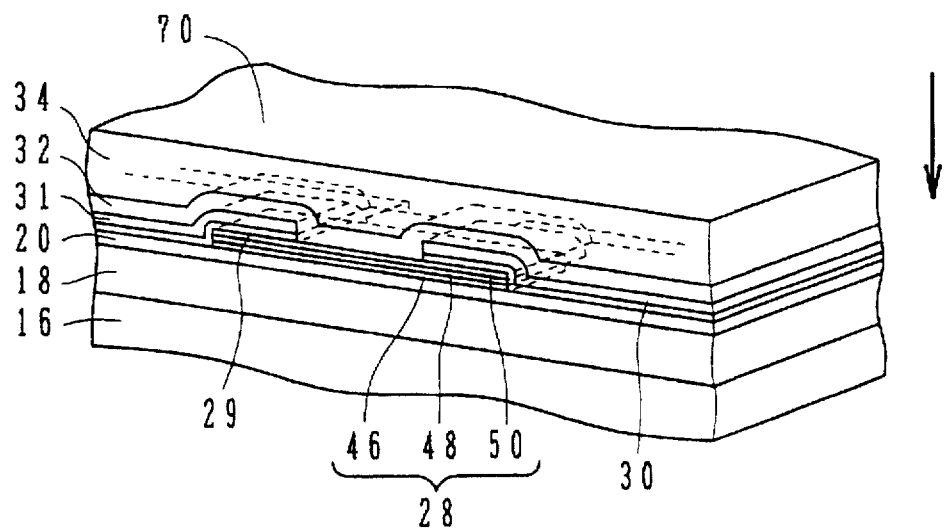

(8) As shown in FIG. 8H, the substrate is set to a lapping block and polished from the upper surface of the inorganic insulating film 74 toward the upper shield—lower core layer 34 as indicated by an arrow, and the lapping is stopped when the upper shield—lower core layer 34 is lapped to a predetermined thickness. In this state, the upper surface 70 of the upper shield—lower core layer 34 has a flat surface parallel to the MR element 28.

Figure 8I:
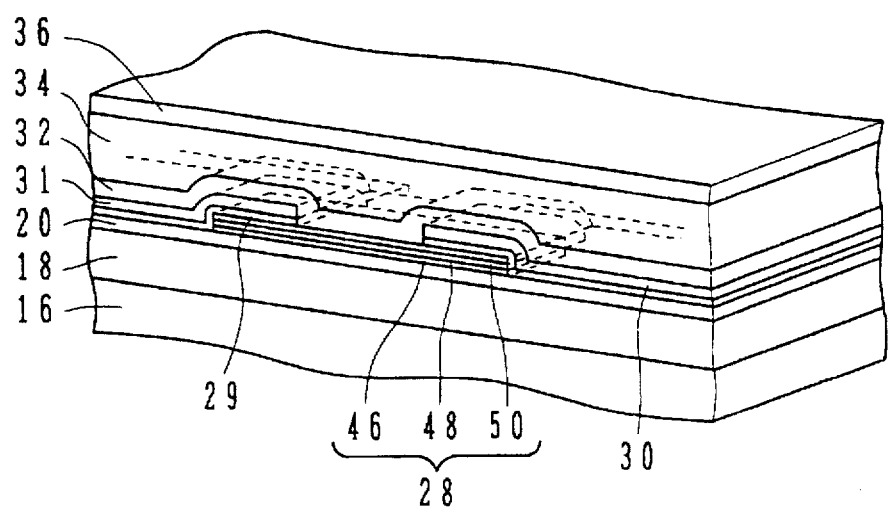

(9) As shown in FIG. 8I, on the lapped upper surface 70, a write gap layer 36 made of alumina or the like is deposited. The write gap layer 36 has also a flat surface parallel to the MR element.

Figure 8J:
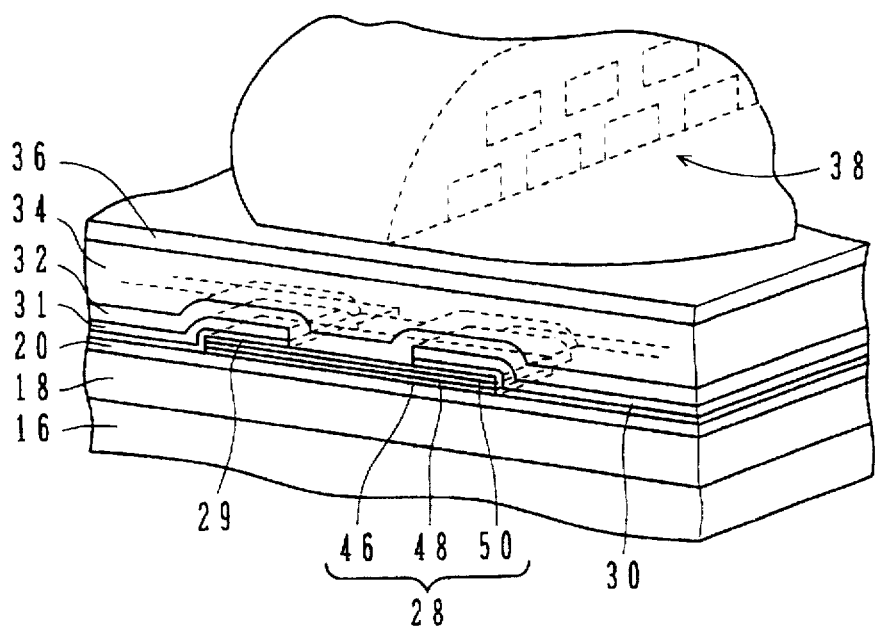

(10) As shown in FIG. 8J, on the write gap layer 36, a coil and insulating layer 38 is formed.

Figure 8K:
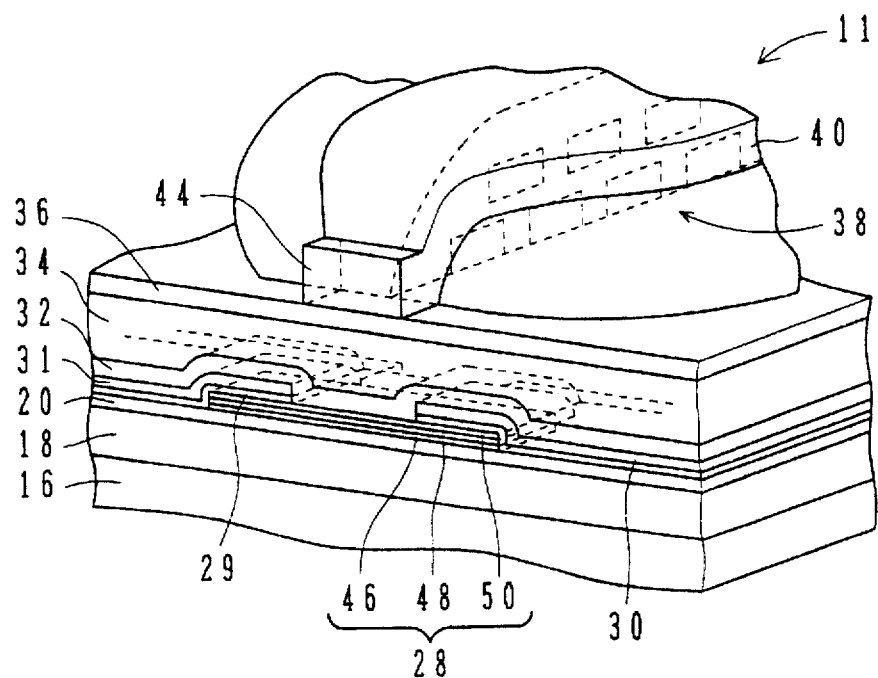

(11) As shown in FIG. 8K, an upper core 40 is formed riding upon the coil and insulating film 38 and connected to the lower core 34 at an inner position. Lastly, a protective film is deposited to cover and complete the composite magnetic head.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A method of manufacturing an induction and magnetoresistance type composite magnetic head comprising the steps of:

(a) forming a magnetoresistive (MR) sensor film on a flat surface of a substrate having a slider surface generally perpendicular to the flat surface;

(b) forming a pair of conductive lead films on said magnetoresistive sensor film and said substrate to define a sensitive region of said magnetoresistive sensor film therebetween;

(c) forming a nonmagnetic insulating film and a first soft magnetic layer over said substrate, said nonmagnetic insulating film covering said lead films and said magnetoresistive sensor film, and said nonmagnetic insulating film and said first soft magnetic layer having non-planar upper surfaces due to topographical irregularities reflecting from said lead film, the magnetoresistive sensor film, the pair of conductive lead films, the nonmagnetic insulating film and the first soft magnetic layer collectively serving as an MR head portion;

(d) forming a sacrificial layer over the first soft magnetic layer;

(e) lapping surfaces of said nonmagnetic insulating layer, said first soft magnetic layer and the sacrificial layer in such a manner as to remove the sacrificial layer and to remove the irregularities on the surface of the first soft magnetic layer and provide a flat surface on said first soft magnetic layer;

(f) forming a gap layer on the flat surface of said first soft magnetic layer; and (g) forming a coil structure and a second soft magnetic layer over the flat gap layer, at least a part of the gap layer between the first and second soft magnetic layers being flat, and the first and second soft magnetic layers, the gap layer and the coil structure collectively serving as an inductive head portion.

2. A method according to claim 1, further comprising the step of patterning said second soft magnetic layer to form a pole above the sensitive region.

3. A method according to claim 2, wherein the center of said pole is offset from the center of the sensitive region.

4. A method according to claim 1, further comprising the step of forming a sacrificial film on said first soft magnetic layer prior to said lapping step.

5. A method according to claim 4, wherein said sacrificial film is an inorganic insulating film.

6. A method according to claim 5, wherein said inorganic insulating film is made of $Al_2O_3$.

* * * * *